(12) United States Patent
Presby et al.

(10) Patent No.: US 7,116,910 B1
(45) Date of Patent: Oct. 3, 2006

(54) FREE SPACE OPTICAL TAP AND MULTI/DEMULTIPLEXER

(75) Inventors: Herman M. Presby, Highland Park, NJ (US); David W. Rush, Sammamish, WA (US)

(73) Assignee: Terabeam Corporation, Falls Church, VA (US)

( * ) Notice: Subject to any disclaimer, the term of this patent is extended or adjusted under 35 U.S.C. 154(b) by 768 days.

(21) Appl. No.: 10/120,950

(22) Filed: Apr. 10, 2002

(51) Int. Cl.
*H04B 10/00* (2006.01)

(52) U.S. Cl. .................. 398/118; 398/83; 398/48; 359/15

(58) Field of Classification Search .............. 398/43, 398/48, 68, 79, 82, 118–131, 83; 385/10, 385/122, 24, 37; 359/3, 15
See application file for complete search history.

(56) References Cited

U.S. PATENT DOCUMENTS

| | | | |
|---|---|---|---|
| 5,272,550 A * | 12/1993 | Dickson et al. ............. | 359/3 |
| 6,263,127 B1 | 7/2001 | Dragone et al. | |
| 6,289,148 B1 | 9/2001 | Lin et al. | |
| 6,289,155 B1 | 9/2001 | Wade | |
| 6,292,280 B1 | 9/2001 | Boffi et al. | |
| 6,298,182 B1 | 10/2001 | Wade | |
| 6,525,846 B1 * | 2/2003 | Yan et al. ............. | 359/15 |
| 6,650,844 B1 * | 11/2003 | Davies et al. ............. | 398/164 |

OTHER PUBLICATIONS

Palmer, C. "Diffraction Grating Handbook", Table of Contents, Ch. 1, 2, 4, and 9, http://www.gratinglab.com/library/handbook4/handbook.asp, Nov. 30, 2001.

* cited by examiner

*Primary Examiner*—David C. Payne
(74) *Attorney, Agent, or Firm*—Blakely Sokoloff Taylor & Zafman LLP

(57) ABSTRACT

A free space optical tap and multi/demultiplexer unit includes at least one optical unit that can tap off an optical signal from and/or add an input optical signal to a received FSO signal. The optical unit propagates the resulting optical signal, via free space, to a next optical unit of the system. The optical unit can include a holographic grating to diffract a portion of the received FSO signal to an optical detector and/or diffract an input optical signal to form part of a free space optical output signal. In addition, the FSO signal can include component signals of different wavelengths, with each optical unit of the system being wavelength specific to a different one of the wavelengths of the FSO signal.

39 Claims, 4 Drawing Sheets

FREE SPACE OPTICAL TAP AND MULTI/DEMULTIPLEXER

CROSS-REFERENCE TO RELATED APPLICATIONS

The present application is related to U.S. patent application Ser. No. 09/886,246, entitled "Internal Reflection Apparatus and Method Using a Holographic Optical Element for a Free Space Optical Communication System" filed Jun. 20, 2001.

FIELD OF THE INVENTION

The field of invention relates generally to optical communication systems; and in particular but not exclusively, relates to free space optical tap and multiplexer/demultiplexer components for use in optical communication systems.

BACKGROUND

With increasing popularity of wide area networks such as the Internet and/or World Wide Web, network growth and traffic have experienced tremendous growth. Network users continue to desire faster networks, which may be difficult to achieve using existing wired technologies.

An alternative to wired network solutions is a wireless or free space optical (FSO) communication technology. Such FSO systems can use beams of light, such as laser beams, as optical communication signals, and therefore do not require cables or fibers connected between transmitters and receivers.

FSO communication systems are typically are typically set up as point-to-point systems. For example, a first station may include an optical transmitter that directs an optical signal (e.g., a laser beam) to a second station having an optical receiver. The optical transmitter can modulate the optical signal to carry data. The optical receiver would then, ideally, collect all of the energy of the optical signal and convert the optical signal into an electrical signal. The optical receiver can operate on this electrical signal recover the modulated data and, in some applications, align the receiver to optimally receive the optical signal. In some applications, optical transceivers are used so that the two stations can send optical signals to each other. Although such FSO communication systems have significant advantages over wired systems, they do not support taps or adders as are used in some wired systems.

SUMMARY OF THE INVENTION

In accordance with aspects of the present invention, an optical communication system is provided with at least one optical unit that can tap off an optical signal from and/or add an input optical signal to a received FSO signal. The optical unit can then propagate the resulting optical signal (i.e., the output signal) in free space to the next optical unit in the optical communication system. In one embodiment, an optical unit can include a holographic grating or gratings to diffract a portion of a received FSO signal to an optical detector and/or diffract an input optical signal to add the input optical signal as part of the output signal.

In another aspect of the present invention, the FSO signal includes component signals of different wavelengths or wavelength ranges. In this aspect, each optical unit is designed to be wavelength specific in tapping off one of the component signals from and/or add an input optical signal to the received FSO signal. This aspect advantageously can be used to implement a wavelength division multiplexing (WDM) system, with each optical unit of the system configured to tap and/or add optical signals of a wavelength that is different from that of the other optical units.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
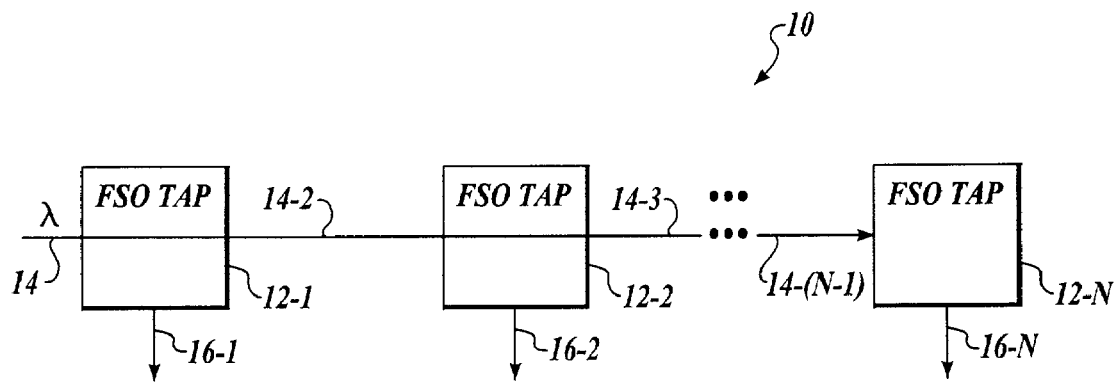
FIG. 1 is a block diagram illustrating a free space optical (FSO) communication system with optical tap units, according to one embodiment of the present invention.

FIG. 1 illustrates a free space optical (FSO) communication system 10, according to one embodiment of the present invention. In this embodiment, system 10 includes optical tap units 12-1 through 12-N. In one embodiment, optical tap units 12-1 through 12-N are substantially identical. In other embodiments, the optical tap units may differ in the amount of power each unit taps from an incoming optical signal. The optical tap units may be implemented using suitable optical units such as, for example, holographic optical elements (HOEs), phase gratings, beamsplitter cubes, etc. so as to perform the functions described below. One possible embodiment of an optical tap unit is described in more detail below in conjunction with FIG. 2.

This embodiment of system 10 operates as follows. Optical tap units 12-1 through 12-N are arranged so that an optical signal 14 is first received by optical tap unit 12-1, which taps off a portion of the power of optical signal 14. Optical signal 14 is a monochromatic signal in one embodiment. Optical tap unit 12-1 outputs the tapped portion of optical signal 14 as a signal 16-1. In one embodiment, optical tap unit 12-1 converts the tapped portion of the optical signal into an electrical signal to serve as output signal 16-1. Optical tap unit 12-1 allows the untapped portion of the optical signal (represented as optical signal 14-2 in FIG. 1) to continue propagating.

Optical tap unit 12-2 is arranged to receive portion 14-2 of optical signal 14. In a manner similar to that of optical tap unit 12-1, optical tap unit 12-2 taps off a portion of the power of optical signal 14-2. Optical tap unit 12-2 may tap the same or a different fraction of power compared to optical tap unit 12-1. Optical tap unit 12-2 then outputs the tapped portion of optical signal 14-2 as a signal 16-2 and allows the untapped portion of the optical signal (i.e., optical signal 14-3) to continue propagating to optical tap unit 12-3. In a similar manner, the remaining optical tap units of system 10 tap off a desired fraction of power from the optical signal passed by the preceding unit in the system. The last optical tap unit (i.e. optical tap unit 12-N) can be configured to collect all of the power of optical signal 14-N from the preceding optical tap unit (not shown).

System 10 provides several features that can be advantageously used in an optical communication system. One important feature is that the optical tap units are free space optical tap units for use in a FSO communication system. Although analogous units exist for wired/fiber systems, it is believed that, heretofore, FSO taps have not been implemented.

Compared to conventional FSO systems, system 10 also provides significant advantages. For example, in a situation in which a network is implemented across several buildings, a single optical signal can be sent from an optical tap unit in one building to optical tap units in the other buildings. In contrast, in a conventional system, a transceiver in each building would have to receive an optical signal from the previous building's transceiver, extract the data, and generate another optical signal, modulate it to contain the extracted data, and send it to the next building's transceiver. Thus, in comparison, system 10 is significantly less complex. Further, if a transceiver in the conventional system fails, then the transceivers after the failed transceiver will not receive the data. In contrast, if a optical tap unit of system 10 fails, the optical signal will continue to propagate to the other optical tap units, which will continue to receive the data despite the failure of one (or more) previous optical tap units.

Figure 2:
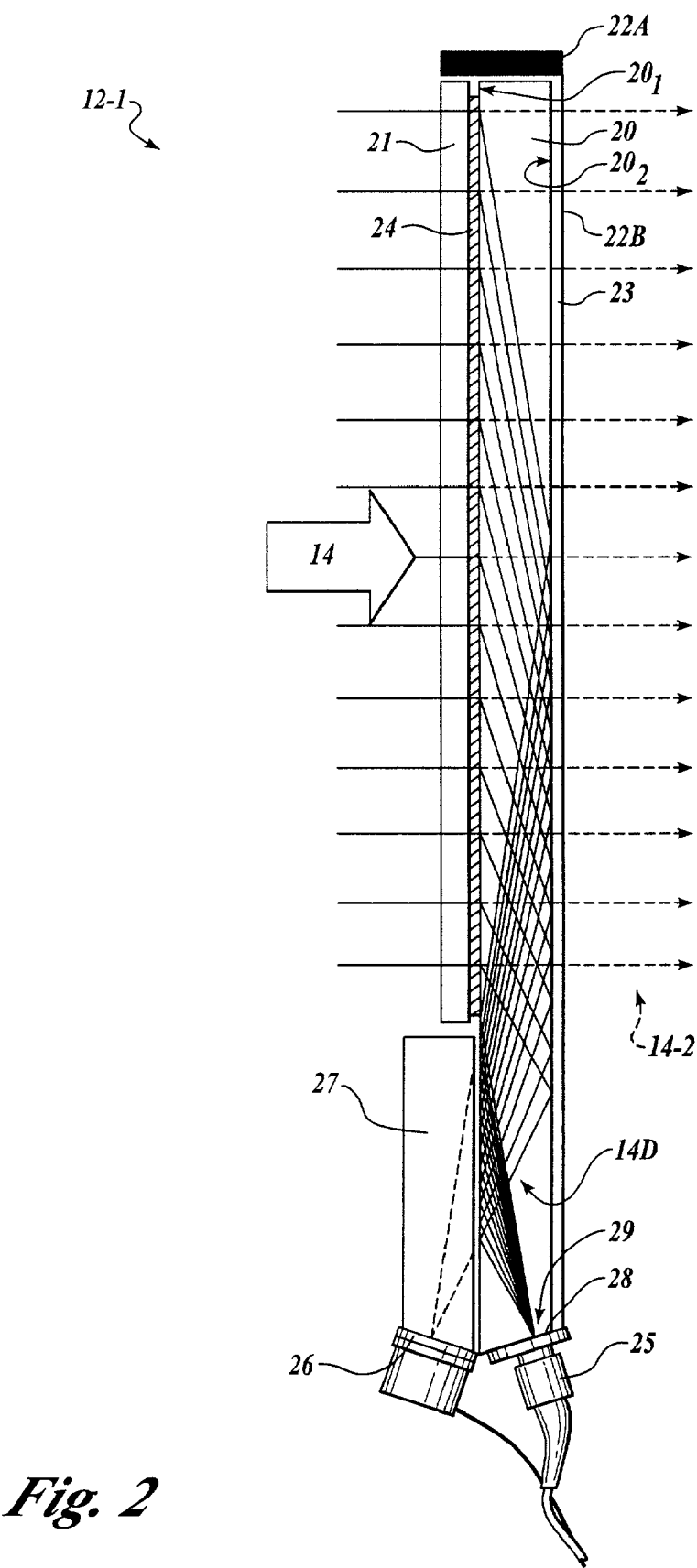
FIG. 2 is a diagram illustrating a holographic optical element (HOE) configured as tap unit as depicted in FIG. 1, according to one embodiment of the present invention.

FIG. 2 illustrates a holographic optical element (HOE) used in optical tap unit 12-1 (FIG. 1), according to one embodiment of the present invention. In other embodiments, other types of optical elements may be used to implement optical tap unit 12-1. A HOE is used in the embodiment because HOEs can offer form factor advantages over other types of optical elements in some instances.

In overview, the HOE can be a substantially inconspicuous light collector device for customer premises, where window space is at a premium or otherwise coveted. The apparatus can be lightweight and eye-safe, as well as being large enough to collect sufficient signal light. In contrast to other types of optical receivers, the apparatus according to an embodiment of the invention allows background visible light to pass through, thereby filtering the background visible light from a photodetector that is to receive the signal light. Thus, an embodiment of the invention provides an apparatus with a sufficiently large aperture that does not consume window space in the same manner as other optical receivers. Further, the HOE collects the desired optical signal while ignoring any undesired wavelengths of light. More particularly, the HOE is designed to diffract the optical signal such that the light signal is collected via total internal reflection with a glass plate of the HOE and directed to an optical detector. Other wavelengths of light will not reach the optical detector because they are not diffracted at the same angle as the optical signal and/or portions propagate through the glass plate without reflection. This mechanism is described in more detail below.

FIG. 2 is a cross-sectional side view of optical tap unit 12-1 (FIG. 1). This embodiment of optical tap unit 12-1 includes elements 20 and 21. These elements can be made from a glass material (such as BK-7 glass or other glass, for example), a plastic material, or other transparent material. Element 21 is positioned to face an optical signal 14 (represented in FIG. 2 as a plurality of light rays) from an optical transmitter or transceiver of FSO communication system 10. For example, during deployment, element 21 can be positioned against a windowpane to receive optical signal 14. In addition, optical tap unit 12-1 includes coverings 22A and 22B, a holographic material 24, optical detectors 25 and 26, and a coupling prism 27.

The components of this embodiment of optical tap unit 12-1 are arranged as follows. Element 20 has a surface $20_1$ (i.e., a front surface) positioned adjacent to element 21 and has a surface $20_2$ (i.e., a back surface). Holographic material 24 having an interference pattern recorded thereon, is disposed between element 21 and front surface $20_1$ of element 20. In another embodiment, holographic material 24 can be disposed within element 20. In yet another embodiment, holographic material 24 can be disposed on back surface $20_2$ of element 20. Covering 22A is formed on the edge surfaces of elements 20 and 21. In this embodiment, covering 22B is formed on the back surface of element 20. In one embodiment, a space 23 is formed between element 20 and covering 22B.

Optical detector 25 is positioned at a surface 28 of element 20. Ideally, surface 28 and optical detector 25 are aligned with a convergence point 29. As described below, convergence point 29 is the point at which a portion of optical signal 14 that is diffracted by holographic material 24 and internally reflected within element 20 is focused. In one embodiment, optical detector 25 includes a large-core optical fiber (with a core diameter of one to two millimeters, for example) having an end surface area that is positioned at surface 28 near convergence point 29. The surface area of the end of the optical fiber may be aligned at a predetermined angle from horizontal, for instance, so as to directly face and receive the internally reflected optical signal at or near convergence point 29.

The optical fiber, in turn, is coupled to light-processing electronics and other components (not shown) that extract the data modulated on optical signal 14. In an alternative embodiment, optical detector circuit 25 can include a photosensitive device, such as a photodiode, phototransistor, PIN detector, avalanche photodiode, charge-coupled device, or other photodetector that is placed near convergence point 29, thereby reducing or eliminating the need to use the optical fiber.

Further, coupling prism 27 is positioned proximate to one of the front or back surfaces of element 20. In one embodiment, coupling prism 27 is positioned near a portion of surface $20_1$, at which the internally reflected optical signal is reflected. In this particular embodiment, this portion is the last reflection area before the internally reflected optical signal reaches optical detector 25. Of course, in other embodiments, coupling prism 27 can be positioned at other portions of element 20 at which the internally reflected optical signal is reflected. Optical detector 26 is positioned at a surface of coupling prism 27.

In operation, optical signal 14 passes through element 21 and is received by an interference pattern recorded on the holographic material 24. In accordance with an embodiment of the invention, the interference pattern includes a diffraction hologram. The interference pattern is structured to angularly direct or diffract a portion of optical signal 14 toward surface 20₂ of element 20, while allowing the remainder of optical signal 14 (i.e., optical signal 14-2 in FIG. 1) to pass through undiffracted. The interference pattern of holographic material 24 can be designed to provide any desired degree of transmission (or reflectance) at a desired wavelength by appropriately adjusting the fringe spacing and orientation of the interference pattern when recording the hologram. For example, holographic gratings can be fabricated with specified wavelength, diffraction order, diffraction angle (or angles) and degree of transmission or efficiency.

With an appropriate choice of angles to diffract optical signal 14 toward surface 20₂, the diffracted portion of optical signal 14 (represented as light rays 14D in FIG. 2) can propagate between surfaces 20₂ and 20₁ via total internal reflection. In accordance with an embodiment of the invention, light rays 14D can be directed toward surface 20₂ at angles forty-two degrees or greater depending upon the value of the "critical angle" for total internal reflection, measured downward from a horizontal plane. This choice for the range of diffraction angles prevents light rays 14D from simply passing through element 20 in a horizontal direction, and instead causes them to be internally reflected between surfaces 20₁ and 20₂. The appropriate angle(s) needed to achieve total-internal-reflection, in one embodiment, can be determined by the index of refraction of the material used for element 20, the angle of incidence of optical signal 14, and the index of refraction of the material adjacent to surface 20₂. The undiffracted portion of optical signal 14 (i.e., optical signal 14-2) would then pass through element 20 and on to optical tap unit 12-2 (FIG. 1).

In embodiments in which holographic material 24 is disposed within element 20, the recorded interference pattern can implement a transmission grating hologram or a reflection grating hologram. If in this embodiment the interference pattern implements a transmission grating hologram, the interference pattern diffracts a portion of optical signal 14 toward back surface 20₂ of element 20 at an appropriate angle(s) for total internal reflection. In this embodiment, the diffraction angles appropriately change throughout the interference pattern so that light rays 14D will converge as they propagate through element 20.

If, however, the interference pattern implements a reflection grating hologram, the interference pattern reflects a portion of optical signal 14 toward front surface 20₁ of element 20 at an appropriate angle(s) for total internal reflection. Once diffracted or reflected toward the appropriate surface of element 20, the diffracted portion of optical signal 14 can propagate between surfaces 20₁ and 20₂ via total internal reflection to optical detector 25.

In embodiments in which holographic material 24 is disposed on back surface 20₂ of element 20, the interference pattern can implement a reflection grating hologram. In such embodiments, optical signal 14 passes through element 20 until it reaches the interference pattern. The interference pattern is structured to reflectively diffract a portion of optical signal 14 towards the first surface 20 at an appropriate angle(s) for total internal reflection. This diffracted portion of optical signal 14 can subsequently propagate between surfaces 20₁ and 20₂ via total internal reflection to optical detector 25.

In the embodiment illustrated in FIG. 2, the interference pattern implements a diffraction grating hologram that causes light rays 14D to be reflected twice before reaching optical detector 25. A factor that can influence the number of reflections is a thickness of element 20 and the path length needed for light rays 14D to sufficient converge for reception by optical detector 25. Further, FIG. 2 illustrates light rays 14D converging as they propagate toward optical detector 25. As previously described, this convergence is designed and controlled during the recording process of holographic material 24. In particular, as shown at FIG. 2, the interference pattern is designed so that light rays 14D approach convergence point 29 near surface 28 of element 20.

Further, background light coming into the receive aperture of optical tap unit 12-1 (i.e., background light incident on element 21) gets dispersed as it passes through the interference pattern. That is, light will substantially pass through element 20 unless it is of a certain wavelength range that is designed to be diffracted by the interference pattern.

Optical tap unit 12-1 can optionally include covering 22A (such as a black coating or other opaque coating) to cover edge surfaces of element 20 (e.g., surfaces different from surfaces 20₁ and 20₂). Covering 22A may also cover the edge surfaces of element 21. Covering 22A prevents light form entering via the sides/edges of elements 20 and 21 and reaching optical detector 25. In effect, covering 22A keeps optical tap unit 12-1 "in the dark" except for light that enters through its aperture.

This embodiment of optical tap unit 12-1 includes optional coupling prism 27 positioned proximate to surface 20₁ of element 20. Coupling prism 27 obtains a portion of the diffracted optical signal that propagates between surfaces 20₁ and 20₂. The separation between coupling prism 27 and surface 20₁ is selected to obtain a desired amount of power from the internally reflected optical signal, which is propagated to optical detector 26. For example, decreasing the distance tends to increase the amount of power coupled from the internally reflected signal. When coupling prism 27 is flush with surface 20₁, substantially all of the power of the internally reflected optical signal is coupled to optical detector 26.

Optical detector 26 is positioned to receive the optical signal from the coupling prism 27. In one embodiment, optical detector is a quadrant cell detector used aligning optical tap unit. In another embodiment, coupling prism 27 and optical detector 26 can be used for automatic gain control purposes or other power/amplitude control of the optical signal received by optical detector 25. For example, increasing the spacing between the coupling prism 27 and surface 20₁ can increase the amount of light that reaches optical detector circuit 25. Conversely, the amount of light that reaches optical detector 25 can be decreased by decreasing the spacing between coupling prism 27 and surface 20₁. For example, positioning coupling prism 27 flush (i.e., in contact) with surface 20₁ can cause substantially no light to reach optical detector circuit 25.

Coupling prism 27 is positioned approximately at the lower ¼ of element 20, where holographic material 24 ends. Holographic material 24 has a length that is chosen to prevent incidence thereon by the internally reflected optical signal. Thus, none of internally reflected light is incident on the interference pattern of holographic material 24, thereby preventing additional diffraction of the internally reflected light.

This embodiment includes optional covering 22B to cover surface 20₂ of element 20. Covering 22B may be made of a material such as clear plastic. An air space or air gap 23 can separate covering 22B from surface 20₂. Covering 22B can protect surface 20₂ from dirt, grime, smudge, and the like that may adversely affect the internally reflected light. The presence of air gap 23 ensures that surface 20₂ is completely free from any of these contaminants so that surface $20_2$ remains clear and undistorted for internal reflection purposes.

Figure 3:
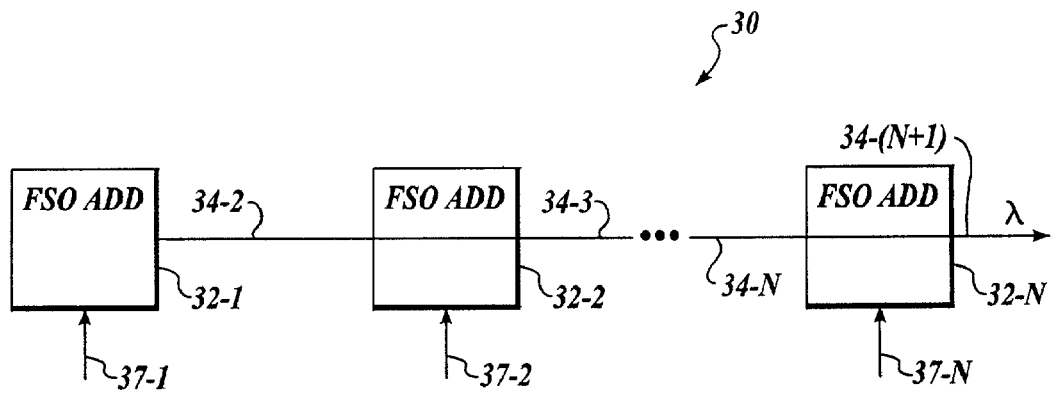
FIG. 3 is a block diagram illustrating a FSO communication system with optical adder units, according to one embodiment of the present invention.

FIG. 3 illustrates a FSO communication system 30 with optical adder units 32-1 through 32-N, according to one embodiment of the present invention. Optical adder units 32-1 through 32-N are similar to optical tap units 12-1 through 12-N except that instead of tapping off power from an optical signal, optical adder units 32-1 through 32-N add power to the optical signal. In one embodiment of exemplary system 30, optical adder unit 32-1 receives an input optical signal 37-1 and outputs it to optical adder unit 32-2 as optical signal 34-2. Optical signal 37-2 is a monochromatic signal in one embodiment.

The optical adder units may be implemented using suitable optical elements such as, for example, holographic optical elements (HOEs), phase gratings, conventional beamsplitting optics, etc. so as to perform the functions described below.

Optical adder unit 32-2 receives an input optical signal 37-2 and adds it to optical signal 34-2 that is received via free space from optical adder unit 32-1. Optical adder unit 32-2 outputs the combined signal as optical signal 34-3, as shown in FIG. 3. In a similar manner, each of optical adder units 32-3 through 32-N (a) receives an optical signal 34-X via free space from the preceding optical adder unit; (b) receives optical signal 37-X; and (c) adds optical signal 37-X to optical signal 34-X (where X represents the number of the particular optical adder unit) to be output via free space to the next optical adder unit in the network.

Further, in some applications, optical adder unit 32-1 may be arranged to receive a FSO signal from another source in some applications and add optical signal 37-1 to this FSO signal as described above for optical adder unit 32-2.

One embodiment of optical adder unit 32-1 is substantially similar to optical tap unit 12-1 (FIG. 2). Referring to FIGS. 2 and 3, the differences between optical adder unit 32-1 and optical tap unit 12-1 are as follows. Instead of optical detector 25 at surface 28, optical adder unit 32-1 has a optical signal emitter. In one embodiment, this emitter is the tip of an optic fiber carrying optical signal 37-1. Optical signal 37-1 is internally reflected within element 20 to reach the interference pattern of holographic material 24.

In one embodiment, the interference pattern of holographic material 24 is designed to diffract internally reflected optical signal 37-1. More specifically, the interference pattern diffracts optical signal 37-1 so that optical signal 37-1 propagates out of surface $20_2$ of element 20 and into free space (directed to optical adder unit 32-2). The interference pattern can also be designed to collimate optical signal 37-1. In this way, optical signal 37-1 is added to the free space optical signal received at surface $20_1$. System 30 can be a time division multiplexed system so that the optical adder units don't cause data collisions when adding a signal to free space optical signal.

Figure 4:
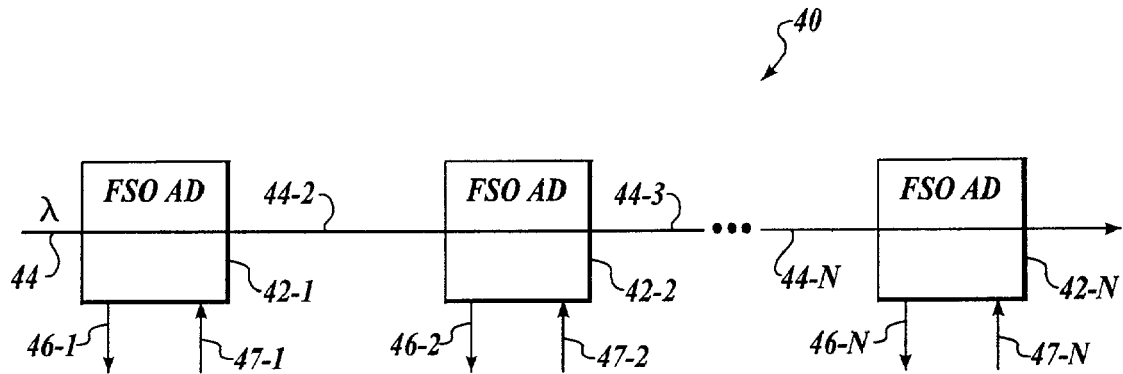
FIG. 4 is a block diagram illustrating a FSO communication system with optical tap/adder units, according to one embodiment of the present invention.

FIG. 4 illustrates a FSO communication system 40 with optical tap/adder units 42-1 through 42-N, according to one embodiment of the present invention. Each of these optical tap/adder units provides the combined functionality of an optical tap unit (as in FIG. 1) and an optical adder unit (as in FIG. 3). For example, optical tap/adder unit 42-1 is positioned to receive an optical signal 44. In one embodiment, optical signal 44 is monochromatic. Optical tap/adder unit 42-1 can diffract a portion of optical signal 44 in the same manner as optical tap unit 12-1 (FIG. 1), outputting the diffracted portion as signal 46-1. The undiffracted portion of optical signal 44 is allowed to propagate to optical tap/adder unit 42-2. In addition, optical tap/adder unit 42-1 can also receive an optical signal 47-1 and combine it with the undiffracted portion of optical signal 44. This combined optical signal is represented in FIG. 4 as optical signal 44-2.

In one embodiment, an optical tap/adder unit of system 40 is similar to optical tap unit 12-1 as described in conjunction with FIG. 2. Referring to FIGS. 2 and 4, an optical tap/adder unit not only includes all of the elements of optical tap unit 12-1, but also includes an optical signal emitter (as in an optical adder unit of FIG. 3) positioned near convergence point 29. In addition, in some embodiments, the optical tap/adder unit includes second interference pattern so that there is one for tapping and one for adding. For example, in optical tap/adder unit 42-1, the optical signal emitter is used to propagate optical signal 47-1 into element 20, where it is internally reflected to the interference pattern of holographic material 24. The interference pattern then diffracts at least a portion of optical signal 47-1 to join the undiffracted portion of optical signal 44 in forming optical signal 44-2. As previously described, optical signal 44-2 is then received by the next optical tap/adder unit (i.e., optical tap/adder unit 42-2). Optical signal 47-1 is transmitted along with the portion of optical signal 44 that was not diffracted by the first interference pattern.

The second interference pattern can be formed in holographic material 24, but separated from the first interference pattern. Alternatively, the second interference pattern may be formed in a different sheet of holographic material. For example, the second interference pattern can be formed in holographic material that is attached to the opposite side of element 20 (i.e., on surface $20_2$). In these two-interference pattern embodiments, the first interference pattern is used as in optical tap unit 12-1 to diffract a portion of optical signal 44 received from an optical tap/adder unit or other free space optical signal source. The second interference pattern is used as in optical adder unit 32-2 (described above in conjunction with FIG. 3) to diffract optical signal 47-1 so that it is part of optical signal 44-2 to be received by optical tap/adder unit 42-2. In one embodiment, optical signal 47-1 propagates in the same path as the undiffracted portion of optical signal 44. In another embodiment, optical signal 47-1 does not propagate in the same path, but is aimed to strike the same spot as the undiffracted portion of optical signal 44 on optical tap/adder unit 42-2.

In other embodiments, a single HOE grating can be used to both tap and add. In one such embodiment, the HOE would implement a single reflection grating configured to function like a beamsplitter. For example, the holographic reflection grating could receive an incoming optical signal (e.g., optical signal 44) from a front side of the holographic reflection grating and tap off a portion (e.g., optical signal 46-1) as previously described. The optical signal to be added (e.g., optical signal 47-1) could be directed to the back side of the holographic reflection grating, which would then diffract the received signal to propagate in the same direction as the undiffracted portion of optical signal 44, which together form optical signal 44-2.

Wavelength Selective Embodiments

Figure 5:
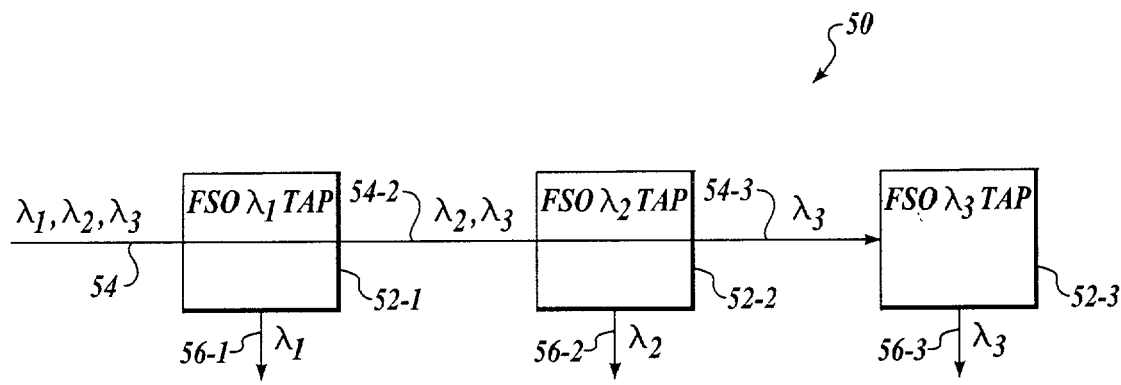
FIG. 5 is a block diagram illustrating a FSO communication system with wavelength demultiplexer units, according to one embodiment of the present invention.

FIG. 5 illustrates a FSO communication system 50 with FSO wavelength tap units 52-1 through 52-3, according to one embodiment of the present invention. In one embodiment, units 52-1 through 52-3 are substantially identical, except for the wavelength each unit is designed to tap. Units 52-1 through 52-3 are configured to tap wavelengths $\lambda_1$, $\lambda_2$, and $\lambda_3$, respectively. For example, in one embodiment, wavelengths $\lambda_1$, $\lambda_2$, and $\lambda_3$, can be 1540 nm, 1550 nm and 1560 nm, respectively. Other embodiments may have a different number of FSO wavelength tap units and/or tap different wavelengths, depending on the application.

This embodiment of system 50 operates as follows. Units 52-1 through 52-3 are arranged so that an optical signal 54 (containing optical signals of wavelengths $\lambda_1$, $\lambda_2$, and $\lambda_3$) is first received by unit 52-1, which taps off the $\lambda_1$ optical signal. Unit 52-1 outputs the $\lambda_1$ optical signal as a signal 56-1. In one embodiment, unit 52-1 converts the tapped $\lambda_1$ optical signal into an electrical signal to serve as output signal 56-1. Unit 52-1 allows the untapped portion (i.e., the $\lambda_2$ and $\lambda_3$ optical signals) of optical signal 54 (represented as optical signal 54-2 in FIG. 5) to continue propagating to unit 52-2. As previously described for optical tap unit 12-1 (FIG. 1), unit 52-1 can include a HOE with an interference pattern implementing a diffraction grating. One embodiment of the HOE is described below in conjunction with FIG. 6.

Unit 52-2 is arranged to receive optical signal 54-2 from unit 52-1. In a manner similar to that of unit 52-1, unit 52-2 taps off the $\lambda_2$ optical signal from optical signal 54-2. Unit 52-2 then outputs the $\lambda_2$ optical signal as a signal 56-2 and allows the $\lambda_3$ optical signal (represented as an optical signal 54-3) to continue propagating to unit 52-3. In a similar manner, unit 52-3 taps the $\lambda_3$ optical signal as signal 56-3.

System 50 provides many of the advantages of aforementioned system 10 (FIG. 1), with the additional feature of each unit being wavelength selective. This feature can be advantageously used in implementing a wavelength division multiplexing (WDM) system.

Figure 6:
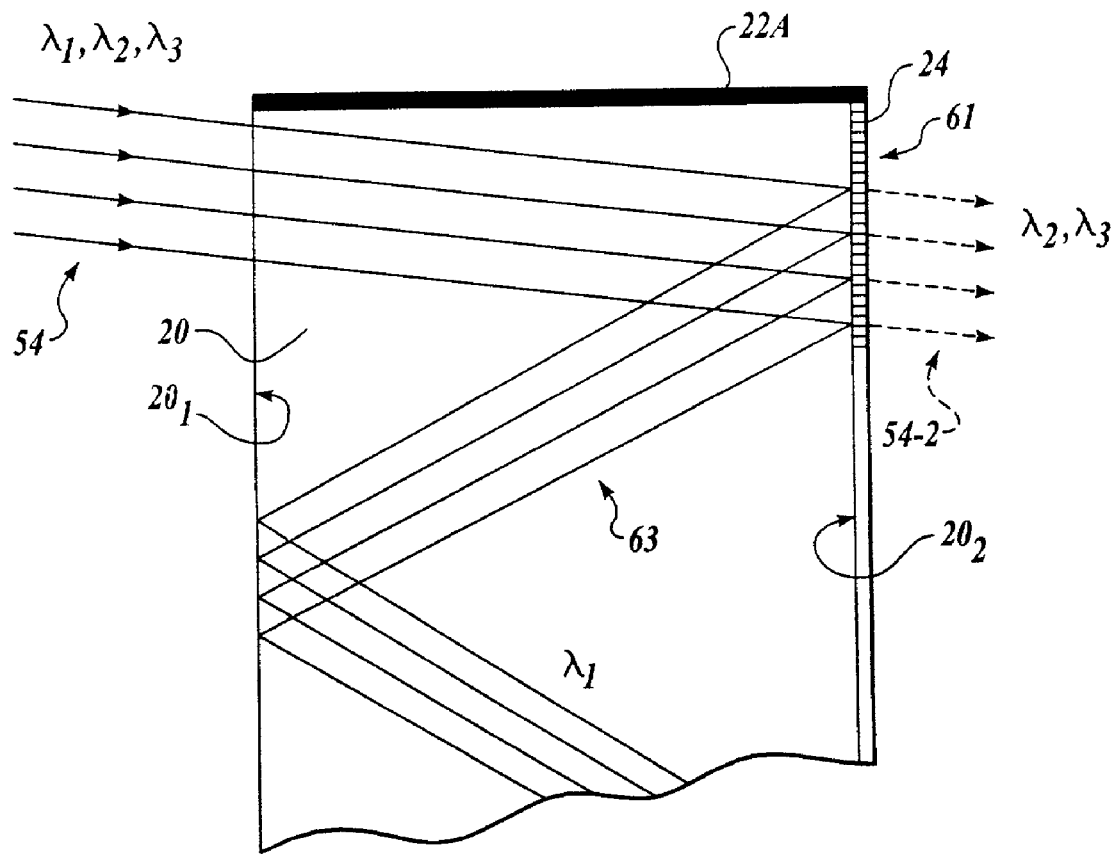
FIG. 6 is a diagram illustrating a HOE configured as a wavelength demultiplexer unit as depicted in FIG. 5, according to one embodiment of the present invention.

FIG. 6 illustrates a portion of unit 52-1 (FIG. 5), according to one embodiment of the present invention. This embodiment includes a HOE, similar to that of FIG. 2, except that in unit 52-1, holographic material 24 is arranged on back surface 20$_2$ of element 20. Further, in this embodiment of unit 52-1, the interference pattern formed in holographic material 24 implements a grating 61 (i.e., a reflection grating). In addition, the interference pattern is formed to reflect optical signals of wavelength $\lambda_1$ while allowing optical signals of wavelengths $\lambda_2$ and $\lambda_3$ to pass through the interference pattern substantially unhindered. For example, the interference pattern can be implemented as a volume phase grating (e.g. a holographic (VPH) grating), which is highly wavelength and orientation selective. Optical signals that do not have the "selected" wavelength or orientation pass through VPHs without being diffracted. Holograms with such interference patterns are commercially available.

In other embodiments, grating 61 may be imbedded in element 20. In yet other embodiments, holographic material 24 may be arranged on front surface 20$_1$ or within element 20, with the interference pattern implementing a transmission grating. This embodiment of unit 52-1 also includes element 21, covering 22B, optical detectors 25 and 26, and coupling prism 27 as in FIG. 2, which are omitted in FIG. 6 to help improve clarity.

In operation, optical signal 54 propagates through element 20 to strike holographic material 24, which is positioned on back surface 20$_2$ of element 20 in this embodiment. As previously described, in this embodiment, holographic material 24 has an interference pattern that implements grating 61, which is wavelength-specific to optical signals of wavelength $\lambda_1$. That is, grating 61 causes an optical signal 63 of wavelength of $\lambda_1$ to be reflectively diffracted from optical signal 54, while allowing the portions of optical signal 54 of wavelengths $\lambda_2$ and $\lambda_3$ to pass through grating 61. These portions of optical signal 54 form optical signal 54-2 (see FIG. 5) that continues propagating to unit 52-2.

In an alternative embodiment in which grating 61 is a transmissive grating arranged on front surface 20$_1$, optical signal 54 propagates through the transmissive grating, which is wavelength-specific to optical signals of wavelength $\lambda_1$. That is, the transmissive grating causes optical signal 63 of wavelength of $\lambda_1$ to be diffracted from optical signal 54 at an angle that results in total internal reflection within element 20. The remaining portion of optical signal 54 (i.e., of wavelengths $\lambda_2$ and $\lambda_3$) but do not experience total internal reflection within element 20. These portions of optical signal 54 form optical signal 54-2 (see FIG. 5) that continues propagating to unit 52-2.

Figure 7:
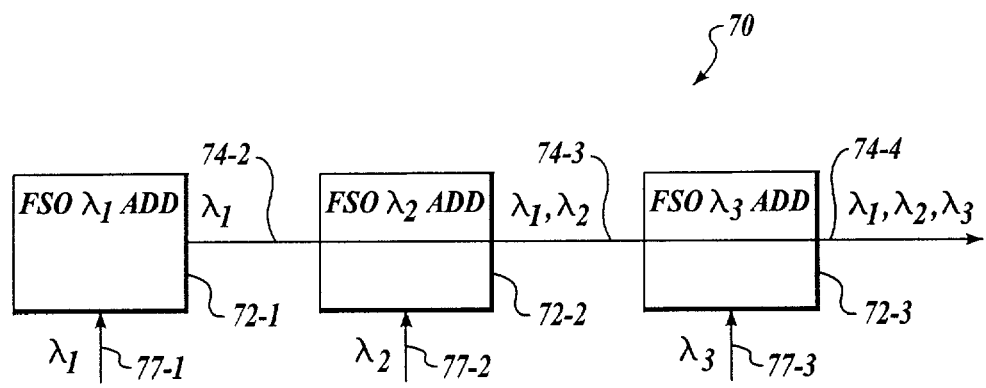
FIG. 7 is a block diagram illustrating a FSO communication system with wavelength multiplexer units, according to one embodiment of the present invention.

FIG. 7 illustrates a FSO communication system 60 with wavelength adder units 72-1 through 72-3, according to one embodiment of the present invention. In one embodiment, units 72-1 through 72-3 are substantially identical, except for the wavelength each unit is designed to add. Units 72-1 through 72-3 are configured to add optical signals of wavelengths $\lambda_1$, $\lambda_2$, and $\lambda_3$, respectively, to an optical signal received from another FSO unit or other source. Other embodiments may have a different number of FSO wavelength adder units, depending on the application.

Adder units 72-1 through 72-3 are similar to tap units 52-1 through 52-3 except that instead of tapping off power from a free space optical signal, adder units 72-1 through 72-3 add optical signals of different wavelengths to a free space optical signal.

For example, in this exemplary embodiment, unit 72-1 receives an optical signal 77-1 of wavelength $\lambda_1$ and outputs it to unit 72-2 as free space optical signal 74-2. Then unit 72-2: (a) receives an optical signal 77-2 of wavelength $\lambda_2$; (b) combines optical signal 77-2 with free space optical signal 74-2 received from unit 72-2; and (c) outputs the combined signal to unit 72-3 as free space optical signal 74-3. In a similar manner, optical adder unit 72-3 adds an optical signal 77-3 to free space optical signal 74-3 and outputs the combined optical signal as free space optical signal 74-4.

Further, in some applications, optical adder unit 72-1 may be arranged to receive a FSO optical signal from another source and add optical signal 77-1 to this FSO signal as described above for optical adder unit 77-2.

One embodiment of unit 72-2 is implemented as follows. One embodiment of wavelength adder unit 72-2 is substantially similar to wavelength tap unit 52-1 (FIG. 6) except that instead of an optical detector to receive an internally reflected signal, unit 72-2 has an optical signal emitter for emitting optical signal 77-2. Optical signal 77-2 is internally reflected within element 20 to reach grating 61.

In one embodiment, grating 61 diffracts internally reflected optical signal 77-2 so that optical signal 77-2 propagates out of surface 20$_2$ of element 20 and into free space (directed to unit 72-3). That is, grating 61 is designed to diffract signals of wavelength $\lambda_2$. Grating 61 can also be designed to collimate optical signal 77-2 when it exits element 20. In addition, grating 61 is designed to be, ideally, completely transmissive to a free space optical signal of wavelength $\lambda_1$. In this way, optical signal 77-2 is added to free space optical signal 74-2 (i.e., of wavelength $\lambda_1$) received from unit 72-1.

Units 72-1 and 72-3 can be similarly implemented, with their gratings being tuned for different wavelengths. For example, the grating for unit 72-1 would be designed to diffract signals of wavelength $\lambda_1$. The grating for unit 72-3 would be designed to diffract signals of wavelength $\lambda_3$, while being transmissive to signals of wavelengths $\lambda_1$ and $\lambda_2$ received from unit 72-2.

Figure 8:
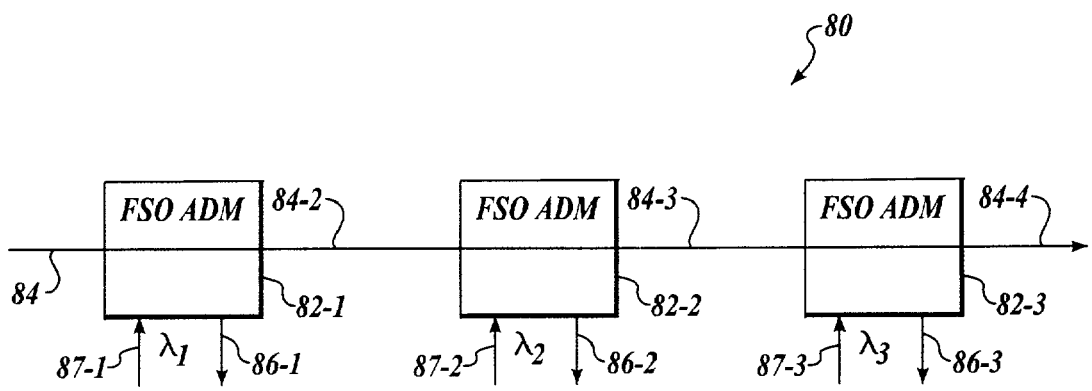
FIG. 8 is a block diagram illustrating a FSO communication system with wavelength multiplexer/demultiplexer units, according to one embodiment of the present invention.

FIG. 8 illustrates a FSO communication system 80 with wavelength tap/adder units 82-1 through 82-3, according to one embodiment of the present invention. Units 82-1 through 82-3, in effect, implement free space optical add/drop multiplexer (OADM) units.

Each of units 82-1 through 82-3 provides the combined functionality of a FSO wavelength tap unit (as in FIG. 5) and a FSO wavelength adder unit (as in FIG. 7). For example, unit 82-1 is arranged to receive an optical signal 84 that can include signals of wavelengths $\lambda_1$, $\lambda_2$, and $\lambda_3$. Unit 82-1 can diffract the $\lambda_1$ wavelength portion of optical signal 84 in the same manner as unit 52-1 (FIG. 5), outputting the diffracted portion as signal 86-1. The undiffracted portion of optical signal 84 (with wavelengths $\lambda_2$, and $\lambda_3$) is allowed to propagate to unit 82-2. In addition, unit 82-1 can receive an optical signal 87-1 (also of wavelength $\lambda_1$) and combine it with the undiffracted portion of optical signal 84. Unit 82-1 outputs this combined optical signal to unit 82-2 as an optical signal 84-2, which therefore can contain wavelengths $\lambda_1$, $\lambda_2$ and $\lambda_3$.

In one embodiment, units 82-1 through 82-3 are similar to the optical tap/adder units as described in conjunction with FIG. 4, except that in units 82-1 through 82-3, the HOEs have interference patterns that are tuned for the specific wavelengths $\lambda_1$, $\lambda_2$ and $\lambda_3$ as appropriate for the particular unit.

Embodiments of method and apparatus for free space optical tap and multi/demultiplexer units are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical communication system, comprising:
a first optical unit arranged to receive a free space optical (FSO) signal, the first optical unit comprising a holographic optical element containing a holographic grating, wherein the first optical unit to propagate a first portion of the FSO signal to a first optical detector and to propagate a first residual portion of the FSO signal in free space out of the first optical unit;
a second optical unit arranged to receive the first residual portion via free space, wherein the second optical unit to propagate a second portion of the first residual portion to a second optical detector; and
a third optical unit arranged to receive the second portion via free space, wherein the third optical unit to propagate a third portion of the second residual portion to a third optical detector.

2. The system of claim 1, wherein the second optical unit to propagate a second residual portion of the first residual portion in free space out of the second optical unit.

3. The system of claim 1, wherein the FSO signal is monochromatic.

4. The system of claim 1, wherein the first portion contains a predetermined fraction of the FSO signal's power.

5. The system of claim 1, wherein the holographic grating is arranged to diffract the first portion from the FSO signal.

6. The system of claim 1, wherein the holographic grating is arranged to allow the first residual portion to pass through the holographic grating.

7. An optical communication system, comprising:
a first optical unit arranged to receive a first input optical signal, wherein the first optical unit to propagate the first input optical signal out of the first optical unit into free space as at least part of a first output signal, wherein the first optical unit is further arranged to receive a free space optical (FSO) signal, the first optical unit to propagate the FSO signal out of the first optical unit into free space as part of the first output signal; and
a second optical unit comprising a holographic optical element containing a holographic grating, the second optical unit arranged to receive the first output signal via free space from the first optical unit and to receive a second input optical signal, wherein the second optical unit to propagate the first output signal and the second input optical signal out of the second optical unit into free space as at least part of a second output signal.

8. The system of claim 7, wherein the first and second input optical signals are of matching wavelengths.

9. The system of claim 7, further comprising:
a third optical unit arranged to receive the second output signal from the second optical unit and to receive a third input optical signal, wherein the third optical unit to propagate the third input optical signal and the second output signal out of the third optical unit into free space as at least part of a third output signal.

10. The system of claim 7, wherein the holographic grating is arranged to diffract the second input optical signal out of the second optical unit into free space.

11. The system of claim 7, wherein the holographic grating is arranged to pass the first output signal received via free space from the first optical unit.

12. The system of claim 11, wherein the holographic grating is arranged to combine the first output signal and the second input optical signal into a single optical beam to serve as the second output signal.

13. An optical communication system, comprising:
a first optical unit arranged to receive a first input optical signal and a first free space optical (FSO) signal, wherein the first optical unit to propagate the first input optical signal out of the first optical unit into free space as at least part of a first output signal, wherein the first optical unit further to propagate a first portion of the FSO signal to a second optical detector and to propagate a second portion of the FSO signal in free space out of the first optical unit as part of the first output signal; and a second optical unit arranged to receive the first output signal via free space from the first optical unit, wherein the second optical unit to propagate a first portion of the first output signal to a first optical detector and to propagate a second portion of the first output signal in free space out of the second optical unit as at least part of a second output signal, the second optical unit further to receive a second input optical signal, wherein the second optical unit to propagate the second input optical signal out of the second optical unit as part of the second output signal.

14. The system of claim 13, further comprising:
a third optical unit arranged to receive the second output signal from the second optical unit and to receive a third input optical signal, wherein the third optical unit to propagate the third input optical signal and at least part of the second output signal out of the third optical unit into free space as at least part of a third output signal.

15. The system of claim 14, wherein the third optical unit further to propagate a first portion of the second output signal to a third optical detector and a second portion of the second output signal as part of the third output signal.

16. The system of claim 13, wherein the first optical unit comprises a holographic optical element containing a holographic grating.

17. The system of claim 16, wherein the holographic grating is arranged to diffract the first input optical signal out of the first optical unit into free space.

18. The system of claim 16, wherein the holographic grating further to diffract the first portion of the FSO signal to the second optical detector and to pass the second portion of the FSO signal as part of the first output signal.

19. The system of claim 16, further comprising a second holographic grating to diffract the first portion of the FSO signal to the second optical detector and to pass the second portion of the FSO signal as part of the first output signal.

20. An optical communication system, comprising:
a first optical unit comprising a holographic optical element containing a holographic grating, the first optical unit arranged to receive a free space optical (FSO) signal having at least a first component signal and a second component signal, the first and second component signals being within different non-overlapping wavelength ranges, wherein the first optical unit to propagate the first component signal to a first optical detector and to propagate a first residual portion of the FSO signal in free space out of the first optical unit, the first residual portion including the second component signal; and
a second optical unit arranged to receive the residual portion of the FSO signal via free space from the first optical unit, wherein the second optical unit to propagate the second component signal of the FSO signal to a second optical detector, wherein the second optical unit to propagate a second residual portion of the FSO signal in free space out of the second optical unit, the second residual portion including a third component signal.

21. The system of claim 20 wherein the first, second and third component signals are monochromatic.

22. The system of claim 20, wherein the holographic grating is arranged to diffract the first component signal without diffracting the second and third component signals.

23. An optical communication system, comprising:
a first optical unit arranged to receive a first input optical signal within a first wavelength range, wherein the first optical unit to propagate the first input optical signal out of the first optical unit into free space as at least part of a first output signal;
a second optical unit comprising a holographic optical element containing a holographic grating, the second optical unit arranged to receive the first output signal via free space from the first optical unit and to receive a second input optical signal within a second wavelength range different from the first wavelength range, wherein the second optical unit to propagate the first output signal and the second input optical signal out of the second optical unit into free space as at least part of a second output signal; and
a third optical unit arranged to receive the second output signal from the second optical unit and to receive a third input optical signal within a third wavelength range different from the first and second wavelength ranges, wherein the third optical unit to propagate the third input optical signal and the second output signal out of the third optical unit into free space as at least part of a third output signal.

24. The system of claim 23, wherein the first optical unit is further arranged to receive a free space optical (FSO) signal, the first optical unit to propagate the FSO signal out of the first optical unit into free space as part of the first output signal.

25. The system of claim 23, wherein the first and second input optical signals are monochromatic signals of different wavelengths.

26. The system of claim 23, wherein the holographic grating to diffract the second input optical signal out of the second optical unit into free space.

27. The system of claim 23, wherein the holographic grating to propagate undiffracted the first output signal received via free space from the first optical unit.

28. The system of claim 23, wherein the holographic grating further to combine the first output signal and the second input optical signal into a single optical beam to serve as the second output signal.

29. An optical communication system, comprising:
a first optical unit arranged to receive a first input optical signal within a first wavelength range and a first free space optical (FSO) signal, wherein the first optical unit comprises a holographic optical element containing a holographic grating, the first optical unit to propagate the first input optical signal out of the first optical unit into free space as at least part of a first output signal; and
a second optical unit arranged to receive the first output signal via free space from the first optical unit, wherein the second optical unit to propagate a first component signal of the first output signal to a first optical detector, the first component signal within a second wavelength range different from the first wavelength range, the second optical unit further to propagate a first residual portion of the first output signal in free space out of the second optical unit as part of a second output signal, the first residual portion including the first input signal, wherein the second optical unit further to receive a second input optical signal, wherein the second optical unit to propagate the second input optical signal out of the second optical unit as part of the second output signal, the second input signal being within the second wavelength range.

30. The system of claim 29, wherein the first optical unit further to propagate a second component signal of the FSO signal to a second optical detector and to propagate a second residual portion of the FSO signal in free space out of the first optical unit as part of the first output signal, the second component signal within the first wavelength range.

31. The system of claim 29, further comprising:
a third optical unit arranged to receive the second output signal from the second optical unit and to receive a third input optical signal, the third input optical signal within a third wavelength range different from the first and second wavelength ranges, wherein the third optical unit to propagate the third input optical signal and at least part of the second output signal out of the third optical unit into free space as at least part of a third output signal.

32. The system of claim 31, wherein the third optical unit further to propagate a third component signal of the second output signal to a third optical detector and a third residual portion of the second output signal as part of the third output signal, the third component signal being within the third wavelength range.

33. The system of claim 29, wherein the holographic grating is arranged to diffract the first input optical signal out of the first optical unit into free space.

34. The system of claim 33, wherein the holographic grating further to diffract the second component signal and to pass the first residual portion of the FSO signal as part of the first output signal.

35. The system of claim 33, further comprising a second holographic grating to diffract the first portion of the FSO signal to the second optical detector and to pass the second portion of the FSO signal as part of the first output signal.

36. A method for use in an optical communication system, the method comprising:
causing, at a first optical unit, the first optical unit comprising a first holographic grating, a first input optical signal to propagate in free space out of the first optical unit as a first output signal;
receiving the first output signal at a second optical unit comprising a second holographic grating;
causing the first output signal to propagate out of the second optical unit as part of a second output signal;
causing, at the second optical unit, a second input optical signal to propagate in free space out of the second optical unit as part of the second output signal; and
receiving the second output signal at a third optical unit;
causing the second output signal to propagate out of the third optical unit as part of a third output signal; and
causing, at the third optical unit, a third input optical signal to propagate in free space out of the third optical unit as part of the third output signal.

37. A method, comprising:
providing a plurality of optical units of an optical communication system;
receiving a free space optical (FSO) signal at a first optical unit of the plurality of optical units;
causing a first portion of the FSO signal to propagate to a first optical detector;
causing a first residual portion of the FSO signal to propagate in free space out of the first optical unit as part of a first output signal, the first output signal propagating to a second optical unit of the plurality of optical units wherein the first and second optical units each comprise a holographic grating;
causing, at the first optical unit, a first input optical signal to propagate in free space out of the first optical unit as part of the first output signal;
receiving the first output signal at the second optical unit;
causing a second portion of the first output signal to propagate to a second optical detector;
causing a second residual portion of the first output signal to propagate in free space out of the second optical unit as part of a second output signal, the second output signal propagating to a third optical unit of the plurality of optical units; and
causing, at the second optical unit, a second input optical signal to propagate in free space out of the second optical unit as part of the second output signal.

38. A method for use in an optical communication system, the method comprising:
causing, at a first optical unit comprising a first holographic grating, a first input optical signal to propagate in free space out of the first optical unit as a first output signal, the first input optical signal being within a first wavelength range;
receiving the first output signal at a second optical unit comprising a second holographic grating;
causing the first output signal to propagate out of the second optical unit as part of a second output signal;
causing, at the second optical unit, a second input optical signal to propagate in free space out of the second optical unit as part of the second output signal, the second input optical signal being within a second wavelength range that does not overlap the first wavelength range;
receiving the second output signal at a third optical unit;
causing the second output signal to propagate out of the third optical unit as part of a third output signal; and
causing, at the third optical unit, a third input optical signal to propagate in free space out of the third optical unit as part of the third output signal, the third input optical signal being within a third wavelength range that does not overlap with the first and second wavelength ranges.

39. A method, comprising:
providing a plurality of optical units of an optical communication system;
receiving a free space optical (FSO) signal at a first optical unit of the plurality of optical units, the first optical unit comprising an holographic grating, the FSO signal having at least a first component signal and a second component signal, the first and second component signals being within different non-overlapping wavelength ranges;
causing the first component signal of the FSO signal to propagate to a first optical detector;
causing a first residual portion of the FSO signal to propagate in free space out of the first optical unit as part of a first output signal, the first output signal propagating to a second optical unit of the plurality of optical units, the second optical unit comprising an holographic grating, the first residual portion containing the second component signal;
causing, at the first optical unit, a first input optical signal to propagate in free space out of the first optical unit as part of the first output signal;
receiving the first output signal at the second optical unit;
causing the second component signal of the first output signal to propagate to a second optical detector;
causing a second residual portion of the first output signal to propagate in free space out of the second optical unit as part of a second output signal, the second output signal propagating to a third optical unit of the plurality of optical units; and
causing, at the second optical unit, a second input optical signal to propagate in free space out of the second optical unit as part of the second output signal.

* * * * *